(12) United States Patent
Miyauchi et al.

(10) Patent No.: US 7,499,247 B2
(45) Date of Patent: Mar. 3, 2009

(54) MAGNETORESISTIVE SENSOR HAVING A PINNED LAYER IN MULTILAYER STRUCTURE

(75) Inventors: Daisuke Miyauchi, Tokyo (JP); Tomohito Mizuno, Tokyo (JP)

(73) Assignee: TDK Corporation, Tokyo (JP)

( * ) Notice: Subject to any disclaimer, the term of this patent is extended or adjusted under 35 U.S.C. 154(b) by 653 days.

(21) Appl. No.: 11/050,014

(22) Filed: Feb. 4, 2005

(65) Prior Publication Data

US 2005/0174692 A1 Aug. 11, 2005

(30) Foreign Application Priority Data

Feb. 6, 2004 (JP) ............................. 2004-030642

(51) Int. Cl.
*G11B 5/39* (2006.01)
(52) U.S. Cl. ................................. 360/324.11
(58) Field of Classification Search ............ 360/324.11, 360/264.1
See application file for complete search history.

(56) References Cited

U.S. PATENT DOCUMENTS

| | | | |
|---|---|---|---|
| 7,151,649 B2 * | 12/2006 | Boutaghou et al. ........ | 360/264.1 |
| 7,173,797 B2 * | 2/2007 | Sbiaa ..................... | 360/324.11 |
| 7,268,979 B2 * | 9/2007 | Gill ........................ | 360/324.11 |
| 2002/0097538 A1 * | 7/2002 | Seyama et al. .......... | 360/324.11 |
| 2003/0011944 A1 | 1/2003 | Hosomi | |
| 2003/0090844 A1 | 5/2003 | Shimizu et al. | |
| 2003/0137785 A1 * | 7/2003 | Saito ..................... | 360/324.11 |
| 2004/0212933 A1 * | 10/2004 | Kim et al. .............. | 360/324.11 |
| 2004/0240124 A1 * | 12/2004 | Sbiaa ..................... | 360/324.11 |

FOREIGN PATENT DOCUMENTS

| | | |
|---|---|---|
| JP | 2002-359412 | 12/2002 |
| JP | 2003-152239 | 5/2003 |

* cited by examiner

*Primary Examiner*—Tianjie Chen
(74) *Attorney, Agent, or Firm*—McGinn IP Law Group, PLLC (57) ABSTRACT

A magnetoresistive sensor comprises stacked layers. The stacked layers comprises a first magnetic layer, a second non-magnetic intermediate layer, and a second magnetic layer in which a direction of magnetization is variable depending on an external magnetic field. The first magnetic layer, the second non-magnetic intermediate layer, and the second magnetic layer are stacked in this order to form the stacked layers. The first magnetic layer has a first ferromagnetic layer in which a direction of magnetization is pinned relative to the external magnetic field, a first non-magnetic intermediate layer, and a second ferromagnetic layer in which a direction of magnetization is pinned in a direction opposite to the direction of magnetization of the first ferromagnetic layer. The first ferromagnetic layer, the first non-magnetic intermediate layer, and the second ferromagnetic layer are stacked in this order. A sense current flows through the stacked layers substantially in the direction of stacking. A ratio of a layer thickness of the second ferromagnetic layer to a layer thickness of the first ferromagnetic layer is in a range between 1.4 and 1.9. A ratio of a product of a saturation magnetization and the layer thickness of the second ferromagnetic layer to a product of a saturation magnetization and the layer thickness of the first ferromagnetic layer is in a range between 0.9 and 1.1.

8 Claims, 5 Drawing Sheets

MAGNETORESISTIVE SENSOR HAVING A PINNED LAYER IN MULTILAYER STRUCTURE

BACKGROUND OF THE INVENTION

1. Field of the Invention

The present invention relates to a magnetoresistive sensor, a thin film magnetic head, a wafer for thin film magnetic heads, a head gimbal assembly, a head arm assembly, a head stack assembly and a hard disk device, and particularly to a magnetoresistive sensor for a thin film magnetic head of a magnetic storage device such as a hard disk device.

2. Description of the Related Art

In order to cope with the recent trend toward high-density magnetic storage, a magnetic head has been developed using a GMR (Giant Magnetoresistive) sensor as a read sensor. In particular, a GMR sensor using SV (spin valve) configuration yields large magnetoresistive ratio for a sense current, supplied to the sensor to read records stored in the storage medium, and can provide a magnetic head of a high sensitivity. In the above description, SV configuration refers to a multi-layered structure formed of a ferromagnetic layer in which the direction of magnetization is pinned in one direction (hereinafter referred to a pinned layer also), a ferromagnetic layer in which the direction of magnetization is varied depending on an external magnetic field emanating from a storage medium (hereinafter, referred to as a free layer also) and a non-magnetic intermediate layer (hereinafter referred to as a non-magnetic spacer layer) interposed between the pinned and free layers. In the SV configuration, the direction of magnetization of the free layer makes an angle relative to the direction of magnetization of the pinned layer, depending on the external magnetic field, causing a change in spin-dependent scattering of conduction electrons as a function of the relative angle, entailing a change in magnetoresistance. The magnetic head detects this change in magnetoresistance and reads the magnetic information stored in the storage medium.

While interests to MR (magnetoresistive) sensors using SV configurations have conventionally been focused on a CIP (Current in Plane)-GMR sensor in which a sense current flows parallel to the layer surface, there has also recently, in order to cope with higher areal density, the development of the magnetic head using a CPP (Current Perpendicular to the Plane)-GMR sensor in which a sense current flows perpendicularly to the layer surface. CPP sensors include a TMR (Tunnel Magnetoresistance) sensor using a TMR layer. The CPP-GMR sensor, however, has been expected to be a sensor of high potential, because the CPP-GMR sensor has a low resistance compared to the TMR sensor, and also has a capability of providing a high output power even in scanning a narrow track compared to the CIP-GMR sensor.

However, it is impossible for the CPP-GMR sensor to attain an enough amount of change in magnetoresistance when the SV configuration in the CIP-GMR sensor is applied to the CPP-GMR sensor. This is mainly because the resistance of the layers that contribute to the change in magnetoresistance (the free layer, the pinned layer and non-magnetic spacer layer) is too small for the overall resistance of the sensor. Specifically speaking, the main reason is in that: while in a CIP sensor, the direction of the current flow is parallel to the layer surface, therefore the change in magnetoresistance caused by spin-dependent scattering can be attained enough in the parallel direction, in a CPP-GMR sensor, however, the sense current is passed through in a direction perpendicular to the layers, i.e., to the boundaries, therefore the spin-dependent scattering at the boundaries is not sufficiently caused; furthermore, a conventional GMR sensor has only two boundaries between the non-magnetic spacer layer and the free and pinned layers. Thus, the contribution of the boundaries to the change in magnetoresistance is small. In view of this problem, Specification etc. of Japanese Patent Laid-open Publication No. 2003-152239 describes a technology intended to increase the magnetoresistive effect in which a non-magnetic spacer layer is interposed into a free layer or a pinned layer to increase the number of boundaries. Specifically, a free layer and a pinned layer in which the free layer is formed of a stack of a first ferromagnetic layer of CoFeB, non-magnetic layer of Cu, and a second ferromagnetic layer of CoFeB was proposed (the CoFeB/Cu/CoFeB stacked structure). Since spin polarization at the boundary between CoFe alloy and Cu is large in the above layer structure, the spin scattering was enhanced and a large change in magnetoresistance was caused.

Furthermore, for example, Specification etc. of Japanese Patent Laid-open Publication No. 2002-359412 describes the technology of enhancing the change in magnetoresistance by sandwiching a high resistance layer in any of the free, pinned and antiferromagnetic layers, thereby causing an increase in resistance of the sensor. In this technology, a metal layer for holding down-spinning was sandwiched to allow spin-dependent scattering to occur in the magnetic layer.

A so-called synthetic pinned layer can be employed for the pinned layer of a CIP-GMR sensor. The synthetic pinned layer is a pinned layer of a stacked structure having a first pinned layer of a magnetic layer, a non-magnetic metal layer, and a second pinned layer of a magnetic layer stacked in this order with the first and second pinned layers being antiferromagnetically coupled. Namely, the entire SV sensor has a construction stacked in the order of substrate layer/antiferromagnetic layer/first pinned layer/first non-magnetic spacer layer/second pinned layer/second non-magnetic spacer layer/free layer/cap layer. In the synthetic pinned layer, because the directions of magnetization of the first and second pinned layers is antiparallel, the magnetization of the pinned layers is suppressed and stabilized. Furthermore, the synthetic pinned layer, in use for a read sensor of a head, can obviate a offset of the bias point caused by the static magnetic field induced by the pinned layer. The application of the synthetic pinned layer to a CPP-GMR sensor has been studied.

When a synthetic pinned layer is applied to a CPP-GMR sensor, the change in the resistance depends on the relative angle of magnetization of the second pinned layer with respect to the free layer. In the CPP structure, however, since the current flows through all the layers, the change in magnetoresistance is caused between the first pinned layer and the free layer, depending on the relative angle of magnetization. As described above, since the directions of magnetization of the second and first pinned layers are antiparallel, the relative directions of magnetization of the two pinned layers with respect to the free layer should also be opposite to each other. For this reason, the change in magnetoresistance that depends on the relative angle of magnetization between the first pinned layer and the free layer will work to cancel the change in magnetoresistance that depends on the relative angle of magnetization between the second pinned layer and the free layer.

In order to overcome the above-described adverse effect, the first pinned layer might be thinner to decrease the change in magnetoresistance caused by the bulk scattering of the first pinned layer and also to decrease the contribution of the resistance of the first pinned layer to the overall resistance of the sensor, while the second pinned layer thicker to increase the change in magnetoresistance caused by the bulk scattering of the second pinned layer and also to increase the contribution of the resistance of the second pinned layer to the overall resistance of the sensor. It is desirable, however, that the first and second pinned layers should have substantially the same amount of magnetization, and should be antiferromagnetically coupled in order to suppress the magnetization of the pinned layers. Accordingly, the configuration in which the thickness of the first and second pinned layers are significantly different is hard to realize. The pinned layer structure that meets such conflicted requirements has not been studied yet.

SUMMARY OF THE INVENTION

It is an object of the present invention to provide a CPP magnetoresistive sensor provided with a synthetic pinned layer having capability of suppressing the magnetization of the synthetic pinned layer and also providing a large magnetoresistance. It is another object of the present invention to provide a thin-film magnetic head etc. using the magnetoresistive sensor.

A magnetoresistive sensor according to the present invention comprises stacked layers. The stacked layers comprises a first magnetic layer, a first non-magnetic intermediate layer, and a second magnetic layer in which a direction of magnetization is variable depending on an external magnetic field. The first magnetic layer, the second non-magnetic intermediate layer, and the second magnetic layer are stacked in this order to form the stacked layers. The first magnetic layer has a first ferromagnetic layer in which a direction of magnetization is pinned relative to the external magnetic field, a first non-magnetic intermediate layer, and a second ferromagnetic layer in which a direction of magnetization is pinned in a direction opposite to the direction of magnetization of the first ferromagnetic layer. The first ferromagnetic layer, the first non-magnetic intermediate layer, and the second ferromagnetic layer are stacked in this order. A sense current flows through the stacked layers substantially in the direction of stacking. A ratio of a layer thickness of the second ferromagnetic layer to a layer thickness of the first ferromagnetic layer is in a range between 1.4 and 1.9. A ratio of a product of a saturation magnetization and the layer thickness of the second ferromagnetic layer to a product of a saturation magnetization and the layer thickness of the first ferromagnetic layer is in a range between 0.9 and 1.1.

As described above, the ratio of the layer thickness of the second ferromagnetic layer to that of the first ferromagnetic layer is in the range between 1.4 and 1.9, and the ratio of the product of the saturation magnetization and the layer thickness of the second ferromagnetic layer to that of the first ferromagnetic layer is in the range between 0.9 and 1.1. This configuration enables a CPP sensor to use a magnetic layer of large saturation magnetization and a small layer thickness for the first ferromagnetic layer and to use a magnetic layer of small saturation magnetization and a large layer thickness for the second ferromagnetic layer. As a result, a magnetoresistive sensor according to the present invention has a thicker second ferromagnetic layer working to contributes to the change in magnetoresistance, enhancing the change in magnetoresistance caused by a bulk scattering effect. It also has a thinner first ferromagnetic layer working to cancel the change in magnetoresistance provided by the second ferromagnetic layer. These features, in corporation with each other, increase the total change in magnetoresistance. Furthermore, the effective magnetization, which is the difference between the product of the saturation magnetization and the layer thickness of the first ferromagnetic layer and that of the second ferromagnetic layer, is suppressed.

A thin-film magnetic head according to the present invention comprises the above-described magnetoresistive sensor for reading data recorded in a storage medium. The magnetoresistive sensor is positioned on an air bearing surface, which is a surface of the thin-film magnetic head opposite to the storage medium.

A wafer according to the present invention comprises at least one thin-film magneto-electric transducer for fabricating the above-described thin-film magnetic head.

A head gimbal assembly according to the present invention comprises a slider that has the above-described thin-film magnetic head, and a suspension for elastically supporting the slider. The slider is positioned opposite to the storage medium.

A head arm assembly according to the present invention comprises the above-described head gimbal assembly and an arm to which the head gimbal assembly is attached.

A head stack assembly according to the present invention comprises a carriage having a plurality of arms, and the above-described head gimbal assemblies. Each of the head gimbal assembly is attached to each of the plurality of arms of the carriage, respectively.

A hard disk device according to the present invention comprises a slider and a locating device. The slider has the above-described thin-film magnetic head, and positioned opposite to a rotarily-driven disciform storage medium. The locating device carries the slider and locates the slider relative to the storage medium.

As described above, according to the present invention, because the ratio of the layer thickness of the second ferromagnetic layer to the layer thickness of the first ferromagnetic layer is set to the range between 1.4 and 1.9, and the ratio of the product of the saturation magnetization and the layer thickness of the second ferromagnetic layer to that of the first ferromagnetic layer is set to the range between 0.9 and 1.1, it is possible to use the magnetic layer of large saturation magnetization and a small layer thickness for the first ferromagnetic layer, and to use the magnetic layer of small saturation magnetization and a large layer thickness for the second ferromagnetic layer. As the result, the total change in magnetoresistance can be increased, while the effective magnetization is suppressed.

The above and other objects, features and advantages of the present invention will become apparent from the following description with reference to the accompanying drawings which illustrate examples of the present invention.

DESCRIPTION OF THE PREFERRED EMBODIMENTS

Figure 1:
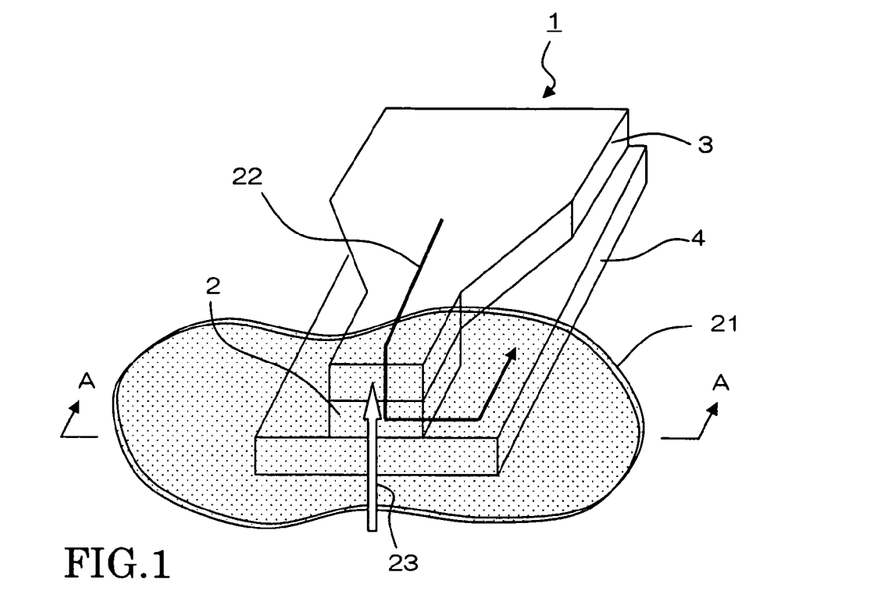
FIG. 1 is a perspective view of a thin-film magnetic head in which a magnetoresistive sensor according to the present invention is employed.

FIG. 1 is a partial perspective view of thin-film magnetic head 1 using a magnetoresistive sensor (hereinafter referred to as a CPP sensor) according to the present invention. The thin-film magnetic head 1 may include a read head portion only or may be an MR/inductive composite head provided with a read and write head portion. CPP sensor 2 is interposed between upper electrode-shield (upper electrode-cum-shield) 3 and bottom electrode-shield 4. One end portion of CPP sensor 2 faces storage medium 21. In CPP sensor 2, a voltage is applied between upper electrode-shield 3 and bottom electrode-shield 4, then a sense current 22 is passed from upper electrode-shield 3 to bottom electrode-shield 4 through CPP sensor 2 in the stacking direction, as shown by the arrow in FIG. 1. The magnetic field of storage medium 21 opposite to CPP sensor 2 varies as storage medium 21 moves in the moving direction 23 of storage medium 21. CPP sensor 2 detects the change in the magnetic field as an electric-resistance change of sense current 22 caused by GMR effect, thereby reads the magnetic information recorded in each magnetic domain of storage medium 21.

Figure 2:
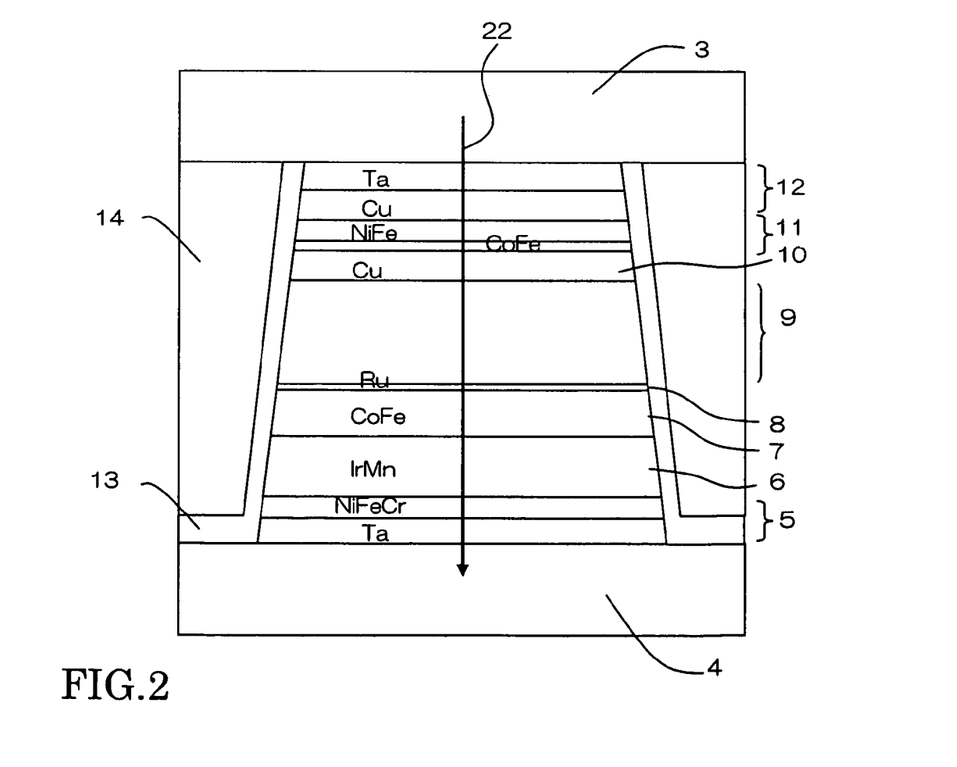
FIG. 2 is a cross-sectional view of the magnetoresistive sensor shown in FIG. 1 as viewed from the ABS.

FIG. 2 represents a cross-sectional structure of CPP sensor. The subject cross-section is a cross-sectional view taken along the A-A direction shown in FIG. 1, illustrating the stacking structure as viewed from the ABS (Air Bearing Surface). The ABS refers to the surface of the magnetic head opposite to storage medium 21 (Hereinafter the surface is referred to as ABS.).

CPP sensor 2 has a stacked structure, starting from bottom electrode-shield 4, in the order of stacking, buffer layer 5, antiferromagnetic layer 6, first pinned layer 7, first non-magnetic spacer layer 8, second pinned layer 9, second non-magnetic spacer layer 10, free layer 11, and cap layer 12, wherein upper electrode-shield 3 is formed on cap layer 12. The direction of magnetization of first pinned layer 7 is pinned with respect to an external magnetic field, and second pinned layer 9 is antiferromagnetically coupled with first pinned layer 7 through first non-magnetic spacer layer 8. The direction of magnetization of second pinned layer 9 is antiparallel to that of first pinned layer 7 under no external magnetic field. The direction of magnetization of free layer 11 varies in response to an external magnetic field. Cap layer 12 is provided to prevent the stacked structure from deterioration. The sides of CPP sensor 2 are covered with hard magnetic layers 14, insulating layers 13 underlain therewith. Hard magnetic layer 14 serves as a magnetic domain control layer for aligning the direction of magnetization of free layer 11. For upper electrode-shield 3 and bottom electrode-shield 4, NiFe is employed. For insulating layer 13, $Al_2O_3$ is employed. For hard magnetic thin layer 14, CoPt, CoCrPt etc. is employed.

From the foregoing, CPP sensor 2 is a bottom SV sensor provided with a stack of: first pinned layer 7, which is a first ferromagnetic layer having the direction of magnetization pinned relative to an external magnetic field; first non-magnetic spacer layer 8; second pinned layer 9; which is a second ferromagnetic layer having the direction of magnetization fixed opposite to that of first pinned layer 7; second non-magnetic spacer layer 10; and free layer 11, which has the direction of magnetization variable relative to an external magnetic field; stacked in this order, with a sense current flowing through the stacked structure in the stacking direction.

Explanation below regards an example of a composition of each layer. First pinned layer 7 is formed of CoFe having a composition of Co90Fe10. First non-magnetic spacer layer 8 is formed of Ru or Rh. Second pinned layer 9 is explained later. Second non-magnetic spacer layer 10 is formed of Cu. Free layer 11 is formed of a CoFe layer and a NiFe layer stacked in this order. The NiFe layer is a soft magnetic layer. The CoFe layer is arranged between the NiFe layer and second non-magnetic spacer layer 10 to promote a larger spin polarization at the Cu boundary than the layer structure in which Cu and NiFe directly contact, thereby causing larger change in magnetoresistance. For free layer 11, NiFeCo may be also utilized for NiFe. Further, the products of saturation magnetization Ms and layer thickness t substantially equal for first pinned layer 7 and second pinned layer 9, as will be described later.

Figure 3:
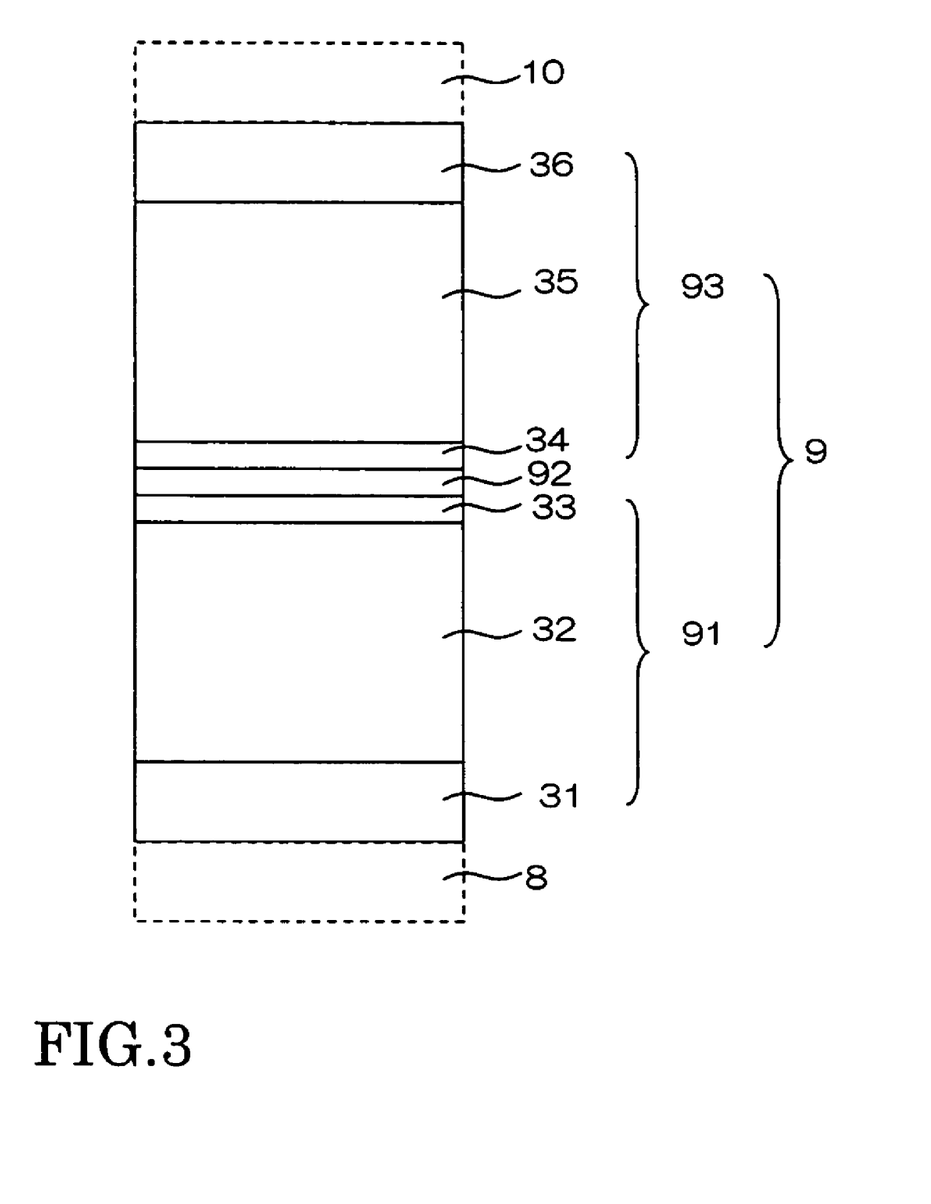
FIG. 3 is an explanatory diagram representing an example of the layer structure of the second pinned layer of the magnetoresistive sensor shown in FIG. 1.

FIG. 3 illustrates an example of a layer structure of second pinned layer. Second pinned layer 9 is formed of first partial stack 91, third non-magnetic spacer layer 92 formed of Cu and second partial stack 93, stacked in this order. First partial stack 91 has a first partial layer of CoFe layer 31, a second partial layer of NiFe layer 32, and a third partial layer of CoFe layer 33, stacked in this order. Second partial stack 93 has a first partial layer of CoFe layer 34, a second partial layer of NiFe layer 35, and a third partial layer of CoFe layer 36, stacked in this order. The composition of CoFe in CoFe layers 31, 33, 34, and 36 is Co50Fe50, and the composition of NiFe in NiFe layers 32 and 35 is Ni81Fe19. Alternatively, the stack structure may be configured such that third non-magnetic spacer layer 92 and second partial stack 93 are not formed, as will described later.

In order to investigate preferable layer structures for second pinned layer 9, the following four tests were performed. A first test was performed to study the influence of the Ms×t ratio of the first and second pinned layers. A second test was performed to study the effect of interposing a CoFe layer into the second pinned layer. A third test was performed to study the effect of forming the second pinned layer only of CoFe. A fourth test was performed to study the effect of interposing a Cu layer into the second pinned layer. Ms×t refers to the product of the saturation magnetization Ms of a layer and the thickness t of the layer of interest. The Ms×t ratio refers to the ratio of Ms×t for second pinned layer 9 to Ms×t for first pinned layer 7. As evaluation items, an MR ratio, an RA value, and magnetic field for reversing magnetization Hex were measured. The MR ratio refers to the ratio of the increment of magnetoresistance ΔR caused by magnetic field change to the resistance of the sensor R, i.e., ΔR/R. The RA refers to the product of the resistance of the sensor R and the area of the sensor A. Even if the MR ratio is constant, larger RA causes a larger change in magnetoresistance ΔR, resulting in a higher output voltage as a magnetic head. The magnetic field for reversing magnetization Hex refers to the magnetic field to cause the effective magnetization of the pinned layer to be reversed. Therefore, a low Hex causes the magnetization of the pinned layer to be reversed at a small magnetic field, entailing an unstable read operation. For the foregoing reasons, it is desirable for the performance of a CPP sensor that all of the MR ratio, RA, and Hex are of larger values.

Explanation next regards a specimen sensor employed for tests. Upper electrode-shield 3 and bottom electrode-shield 4 were made of NeFe alloy, and serve as an upper shield and a lower shield, as well. The SV sensor interposed between upper electrode-shield 3 and bottom electrode-shield 4 was worked by means of milling. The pattern size was set to be 0.2 µm×0.2 µm. Hard magnetic layer 14 was not provided on the short edges which appeared in the section viewed from the plane perpendicular to the ABS, these edges were covered with insulating layers 13 made of $Al_2O_3$. Layer forming process was done by sputtering method, and pinned layer 7 was annealed at 270 degrees for 4 hours for fixing pinned layer 7 after formed.

Explanation is presented in sequence regarding the results of the tests below. The Ms×t ratio of the first and second pinned layers was studied in the first test.

The material of the first and second pinned layers was first studied. It is desirable for first pinned layer to employ a magnetic layer having large saturation magnetization Ms and small specific resistance, and for second pinned layer a magnetic layer having small saturation magnetization Ms and large specific resistance. For this reason, CoFe alloy was employed for first pinned layer 7, and NiFe alloy was employed for second pinned layer 9. The reason for employing NiFe alloy is that the bulk scattering coefficient β is nearly equal to that of CoFe alloy (approximately 0.65), thus enabling larger change in magnetoresistance depending on the bulk scattering in proportion to the layer thickness. In other words, in order to increase a change in magnetoresistance depending on the bulk scattering, it is desirable to increase the resistance ratio $\rho d/\rho u$ ($\rho d$ stands for the specific resistance for a down-spin conduction electron, and $\rho u$ stands for the specific resistance for an up-spin conduction electron). Since there is a relation $\rho d/\rho u = (1+\beta)/(1-\beta)$ between the resistance ratio $\rho d/\rho u$ and the bulk scattering coefficient β, if the bulk scattering coefficients β are equal, then the resistance ratios $\rho d/\rho u$ are also equal; and consequently, a larger change in magnetoresistance can be obtained corresponding to a larger thickness of the layer.

The conditions of the studies stipulated that: first pinned layer was 3 nm (30 Angstrom) thick; first non-magnetic spacer layer 8 was 0.4 nm (40 Angstrom) thick; second non-magnetic spacer layer 10 was 3 nm (30 Angstrom) thick; and free layer was 5 nm (50 Angstrom); wherein the thicknesses of the above layers were fixed, while only the thickness of second pinned layer 9 was varied, thereby varying the Ms×t ratio. Refer to Table 1 for detail data for the layer structure other than the above-described layer structure.

Table 1 shows the test results. For reference, Table 1 is listed in an ascending order starting from buffer layer 5, a Ta layer, arranged in contact with bottom electrode-shield 4, to cap layer 12, a Ta layer, arranged in contact with upper electrode-shield 3. The same applies to the other tables listed below.

TABLE 1 unit: Å(0.1 nm)

| | | Case | | | | | | |
|---|---|---|---|---|---|---|---|---|
| | | 1-1 | 1-2 | 1-3 | 1-4 | 1-5 | 1-6 | 1-7 |
| Cap layer | Ta | 30 | 30 | 30 | 30 | 30 | 30 | 30 |
| | Cu | 50 | 50 | 50 | 50 | 50 | 50 | 50 |
| Free layer | NiFe | 40 | 40 | 40 | 40 | 40 | 40 | 40 |
| | CoFe | 10 | 10 | 10 | 10 | 10 | 10 | 10 |
| Second non-magnetic interrim layer | Cu | 30 | 30 | 30 | 30 | 30 | 30 | 30 |
| Second pinned layer | NiFe | 15 | 30 | 50 | 54 | 58 | 70 | 90 |
| First non-magnetic interrim later | Ru | 4 | 4 | 4 | 4 | 4 | 4 | 4 |
| First pinned layer | CoFe | 30 | 30 | 30 | 30 | 30 | 30 | 30 |
| Antiferromagnetic layer | IrMn | 70 | 70 | 70 | 70 | 70 | 70 | 70 |
| Buffer layer | NiFeCr | 50 | 50 | 50 | 50 | 50 | 50 | 50 |
| | Ta | 10 | 10 | 10 | 10 | 10 | 10 | 10 |
| Ms/t ratio (Second pinned/first pinned) | | 0.28 | 0.56 | 0.93 | 1.00 | 1.07 | 1.30 | 1.67 |
| Ratio of thickness (second pinned/first pinned) | | 0.50 | 1.00 | 1.67 | 1.80 | 1.93 | 2.33 | 3.00 |
| MR ratio(%) | | 0.6 | 0.8 | 1.1 | 1.2 | 1.3 | 1.4 | 1.3 |
| RA(Ωµm2) | | 0.08 | 0.085 | 0.088 | 0.09 | 0.093 | 0.095 | 0.1 |
| Hex(kOe) | | 0.2 | 0.33 | 0.55 | 0.6 | 0.57 | 0.4 | 0.25 |

When the layer thickness of second pinned layer 9 is set to 5.4 nm (54 Angstrom), the Ms×t values of the first and second pinned layers equal (the Ms×t ratio=1.00) and the value of Hex is the largest (case 1-4). If second pinned layer 9 is thinner, both of Hex and RA get worse. If second pinned layer 9 is thicker, RA increases, because the resistance of second pinned layer 9 increases, and MR ratio also increases. However, the increase in the net moment causes Hex to be significantly reduced. Furthermore, there is the possibility in which the totalized thickness of pinned layers 7, 9 and free layer 11 becomes too large to reduce MR ratio as a whole. In addition, although not shown in the table, the influence of the static magnetic field emanating from the pinned layer becomes larger, thereby causing large offset of the bias point when it is used as a head sensor.

Thus, it is preferred to configure first and second pinned layers 7, 9 such that the Ms×t values of both magnetic layers substantially equal, and the ratio of layer thickness of second pinned layer 9 to that of first pinned layer 7 to the value ranges between 1.4 and 1.9.

The reason for employing NiFe layer as the second pinned layer can be also explained using the above-described study results. If a material having smaller saturation magnetization than that of first pinned layer 7 is employed for second pinned layer 9, and second pinned layer 9 is configured to have a value of Ms×t equal to that of first pinned layer 7 as shown in case 1-4, then it is possible to thicken second pinned layer 9, thereby enhancing the resistance of the sensor while suppressing parasitic resistance. By using Co90Fe10 for first pinned layer 7 and Ni81Fe19 for second pinned layer 9, second pinned layer 9 can be thickened by 1.8 times that of first pinned layer 7, because the ratio of the saturation magnetization Ms is approximately 1.8:1. In addition, Co90Fe10 has a sheet resistance of approximately 20 μΩ cm, while Ni81Fe19 has a sheet resistance of approximately 28 μΩ cm, which is 1.4 times that of Co90Fe10. From the foregoing reasons, the resistance can be increased. Consequently, it becomes feasible to enhance the resistance of an MR sensor while suppressing the parasitic resistance, thereby enabling the MR ratio to be enhanced.

According to the studies shown in Table 1, however, Hex is small in all cases. The reason for this result is considered that the exchange coupling energy between the CoFe and NiFe layers is small, and as the result, the antiferromagnetic coupling is insufficient. For this reason, in the second test, CoFe layers were provided on both sides of second pinned layer 9, i.e., a NiFe layer, and the effect of the above-described stacked structure was studied.

The conditions of the studies stipulated that: the layer thickness of each CoFe layer of second pinned layer 9 was fixed at 0.5 nm (5 Angstrom), and the thickness of the NiFe layer was varied. Table 2 lists the study results.

Interposing a CoFe layer at the boundary with non-magnetic spacer layer 8 (Ru layer) causes enhancement of the antiferromagnetic coupling between the CoFe layers in first pinned layer 7 and second pinned layer 9 as compared to case 1-4 in which second pinned layer 9 is made of a NiFe layer only, and Hex was significantly enhanced (the cases 2-2 through 4). The MR ratio was also improved, because the second pinned layer was more strongly antiferromagnetically pinned, and a CoFe layer, which has high interface spin asymmetry coefficient, was interposed between second non-magnetic spacer layer 10 and the NiFe layer of second pinned layer 9. For reference, in this case, the Ms×t ratio is preferably approximately 1 as well as case 1, and the cases 2-2 through 4 are preferred.

From the studies described above, it has been proved that second pinned layer 9 preferably has a fundamental structure of CoFe/NiFe/CoFe. For reference, an expression such as A/B/C/D may be used in the specification to represent a layer structure. The above expression represents a stack structure arranged in the order of layer A, layer B, layer C and layer D from the side of buffer layer 5.

Conventionally, however, CoFe has been used as a pinned layer. For this reason, in the third test, comparison was made of the cases where second pinned layer 9 has a layer structure of CoFe/NiFe/CoFe (case 2-3) and where second pinned layer 9 is formed of CoFe only in order to confirm the advantage of the structure CoFe/NiFe/CoFe The results of the studies are listed in Table 3. In the table, case 3-2 corresponds to case 2-3.

TABLE 2 unit: Å(0.1 nm)

| | | Case | | | | | | |
|---|---|---|---|---|---|---|---|---|
| | | 2-1 | 2-2 | 2-3 | 2-4 | 2-5 | 2-6 | 1-4 |
| Cap layer | Ta | 30 | 30 | 30 | 30 | 30 | 30 | 30 |
| | Cu | 50 | 50 | 50 | 50 | 50 | 50 | 50 |
| Free layer | NiFe | 40 | 40 | 40 | 40 | 40 | 40 | 40 |
| | CoFe | 10 | 10 | 10 | 10 | 10 | 10 | 10 |
| Second non-magnetic interrim layer | Cu | 30 | 30 | 30 | 30 | 30 | 30 | 30 |
| Second pinned layer | CoFe | 5 | 5 | 5 | 5 | 5 | 5 | 0 |
| | NiFe | 12 | 32 | 36 | 40 | 52 | 72 | 54 |
| | CoFe | 5 | 5 | 5 | 5 | 5 | 5 | 0 |
| First non-magnetic interrim later | Ru | 4 | 4 | 4 | 4 | 4 | 4 | 4 |
| First pinned layer | CoFe | 30 | 30 | 30 | 30 | 30 | 30 | 30 |
| Antiferromagnetic layer | IrMn | 70 | 70 | 70 | 70 | 70 | 70 | 70 |
| Buffer layer | NiFeCr | 50 | 50 | 50 | 50 | 50 | 50 | 50 |
| | Ta | 10 | 10 | 10 | 10 | 10 | 10 | 10 |
| Ms/t ratio (Second pinned/first pinned) | | 0.56 | 0.93 | 1.00 | 1.07 | 1.30 | 1.67 | 1.00 |
| Ratio of thickness (second pinned/first pinned) | | 0.73 | 1.40 | 1.53 | 1.67 | 2.07 | 2.73 | 1.80 |
| MR ratio(%) | | 0.9 | 1.2 | 1.5 | 1.6 | 1.7 | 1.5 | 1.2 |
| RA(Ωμm2) | | 0.085 | 0.088 | 0.09 | 0.093 | 0.095 | 0.1 | 0.09 |
| Hex(kOe) | | 1.1 | 1.8 | 2 | 1.9 | 1.3 | 0.8 | 0.6 |

TABLE 3

| Case | | 3-1 | 3-2 |
|---|---|---|---|
| | | unit: Å (0.1 nm) | |
| Cap layer | Ta | 30 | 30 |
| | Cu | 50 | 50 |
| Free layer | NiFe | 40 | 40 |
| | CoFe | 10 | 10 |
| Second non-magnetic interrim layer | Cu | 30 | 30 |
| Second pinned layer | CoFe | 0 | 5 |

TABLE 3-continued

| Case | | 3-1 | 3-2 |
|---|---|---|---|
| | | unit: Å (0.1 nm) | |
| | NiFe | 0 | 36 |
| | CoFe | 30 | 5 |
| First non-magnetic interrim later | Ru | 4 | 4 |
| First pinned layer | CoFe | 30 | 30 |
| Antiferromagnetic layer | IrMn | 70 | 70 |
| Buffer layer | NiFeCr | 50 | 50 |
| | Ta | 10 | 10 |
| Ms/t ratio (Second pinned/first pinned) | | 1 | 1 |
| Ratio of thickness (second pinned/first pinned) | | 1.00 | 1.53 |
| MR ratio (%) | | 1.2 | 1.5 |
| RA(Ωμm2) | | 0.082 | 0.09 |
| Hex(kOe) | | 2 | 2 |

As described above, it was confirmed that the resistance of the sensor is increased and the MR ratio is increased by utilizing a CoFe/NiFe/CoFe layer (case 3-2) for a CoFe layer (case 3-1).

From the above-described studies, it is proved that the ratio of Ms×t of first pinned layer 7 to that of second pinned layer 9 is preferably 0.9 or more and 1.1 or less and the layer structure of second pinned layer 9 is preferably CoFe/NiFe/CoFe.

The fourth test regards the effect of interposing a Cu layer into second pinned layer 9. The condition of the study stipulated that: a Cu layer was not interposed into first pinned layer 7, because it works as a parasitic resistance, and a Cu layer was interposed into second pinned layer 9. In the specific layer structure, two layers of CoFe/NiFe/CoFe were formed and a Cu layer was interposed between the two layers. In this layer structure, the thickness of the NiFe layer was varied and the Ms×t ratio was taken as a parameter, as with the case of the second test. Table 4 represents the results of the study.

TABLE 4

| | | Case | | | | | | |
|---|---|---|---|---|---|---|---|---|
| | | 4-1 | 4-2 | 4-3 | 4-4 | 4-5 | 4-6 | 2-3 |
| | | | | | | | | unit: Å(0.1 nm) |
| Cap layer | Ta | 30 | 30 | 30 | 30 | 30 | 30 | 30 |
| | Cu | 50 | 50 | 50 | 50 | 50 | 50 | 50 |
| Free layer | NiFe | 40 | 40 | 40 | 40 | 40 | 40 | 40 |
| | CoFe | 10 | 10 | 10 | 10 | 10 | 10 | 10 |
| Second non-magnetic interrim layer | Cu | 30 | 30 | 30 | 30 | 30 | 30 | 30 |
| Second pinned layer | CoFe | 5 | 5 | 5 | 5 | 5 | 5 | 5 |
| | NiFe | 3 | 13 | 15 | 17 | 23 | 33 | 36 |
| | CoFe | 2 | 2 | 2 | 2 | 2 | 2 | 5 |
| | Cu | 2 | 2 | 2 | 2 | 2 | 2 | 0 |
| | CoFe | 2 | 2 | 2 | 2 | 2 | 2 | 0 |
| | NiFe | 3 | 13 | 15 | 17 | 23 | 33 | 0 |
| | CoFe | 5 | 5 | 5 | 5 | 5 | 5 | 0 |
| First non-magnetic interrim later | Ru | 4 | 4 | 4 | 4 | 4 | 4 | 4 |
| First pinned layer | CoFe | 30 | 30 | 30 | 30 | 30 | 30 | 30 |
| Antiferromagnetic layer | IrMn | 70 | 70 | 70 | 70 | 70 | 70 | 70 |
| Buffer layer | NiFeCr | 50 | 50 | 50 | 50 | 50 | 50 | 50 |
| | Ta | 10 | 10 | 10 | 10 | 10 | 10 | 10 |
| Ms/t ratio (Second pinned/first pinned) | | 0.58 | 0.95 | 1.02 | 1.10 | 1.32 | 1.69 | 1.00 |
| Ratio of thickness (second pinned/first pinned) | | 0.73 | 1.40 | 1.53 | 1.67 | 2.07 | 2.73 | 1.53 |
| MR ratio(%) | | 1.3 | 1.6 | 1.9 | 2 | 2.1 | 1.9 | 1.5 |
| RA(Ωμm2) | | 0.09 | 0.092 | 0.095 | 0.099 | 0.1 | 0.106 | 0.09 |
| Hex(kOe) | | 1.1 | 1.8 | 2 | 1.9 | 1.3 | 0.8 | 2 |

Hex was the largest in the case 4-3 in which the NiFe layer was set to about 1.5 nm (about 15 Angstrom), and the values of Ms×t of first and second pinned layers substantially equaled. In case 4-3, MR ratio was relatively good as well. The comparison of case 4-3 with case 2-3, in which the Cu layer is not interposed, shows that the MR ratio is significantly improved while Hex is comparable.

As described above, by interposing a Cu layer into second pinned layer only, while not interposing a Cu layer into first pinned layer, MR ratio can be improved more effectively.

It should be noted that a magnetoresistive sensor of the present invention is not limited to the layer structure explained above. For example, Fe-richer composition than Co50Fe50 may be adapted for second pinned layer 9 to increase bulk scattering. A Cu layer may be interposed into the free layer 7.

Finally, the performance of a head in which the subject magnetoresistive sensor was provided as a head sensor was examined.

The employed head had a layer structure shown in FIG. 2 with a junction size of 0.1×0.1 μm. A sense current was set to 5 mA during the measurement. Case 5-1 corresponds to case 4-3, case 5-2 corresponds to case 3-1, case 5-3 corresponds to 2-3 and case 5-4 corresponds to case 2-6, respectively. Table 5 represents, as representative magneto-electric conversion characteristics, the output power normalized with respect to case 5-1, and probability of pinned layer reversing judged from the r-H curve, a curve representing the change in magnetoresistance versus an external magnetic field.

TABLE 5 unit: Å(0.1 nm)

| | | Case 5-1 | Case 5-2 | Case 5-3 | Case 5-4 |
|---|---|---|---|---|---|
| Cap layer | Ta | 30 | 30 | 30 | 30 |
| | Cu | 50 | 50 | 50 | 50 |
| Free layer | NiFe | 40 | 40 | 40 | 40 |
| | CoFe | 10 | 10 | 10 | 10 |
| Second non-magnetic interrim layer | Cu | 30 | 30 | 30 | 30 |
| Second pinned layer | CoFe | 5 | 0 | 5 | 5 |
| | NiFe | 14.9 | 0 | 36 | 72 |
| | CoFe | 2 | 30 | 5 | 5 |
| | Cu | 2 | 0 | 0 | 0 |
| | CoFe | 2 | 0 | 0 | 0 |
| | NiFe | 14.9 | 0 | 0 | 0 |
| | CoFe | 5 | 0 | 0 | 0 |
| First non-magnetic interrim later | Ru | 4 | 4 | 4 | 4 |
| First pinned layer | CoFe | 30 | 30 | 30 | 30 |
| Antiferromagnetic layer | IrMn | 70 | 70 | 70 | 70 |
| Buffer layer | NiFeCr | 50 | 50 | 50 | 50 |
| | Ta | 10 | 10 | 10 | 10 |
| Normalized output power | | 1 | 0.6 | 0.8 | 0.65 |
| Normalized probability of pinned layer reversing | | 1 | 1 | 1 | 3 |

The layer structure of case 5-1 was best in view of output power due to the effect of the CoFe/NiFe/CoFe structure and the interposition of Cu. Case 5-3 provides the next best output power in which the CoFe/NiFe/CoFe structure is provided but Cu is not interposed. Case 5-2 provides less output power in which neither CoFe/NiFe/CoFe structure is formed nor Cu is interposed. The thick layer of second pinned layer 9 (case 5-4) yields small Hex, causing a large probability of pinned layer reversing. It was proved, as described above, that when the subject magnetoresistive sensor was provided as a head sensor, the results in conformity with the foregoing study results were obtained.

Figure 4:
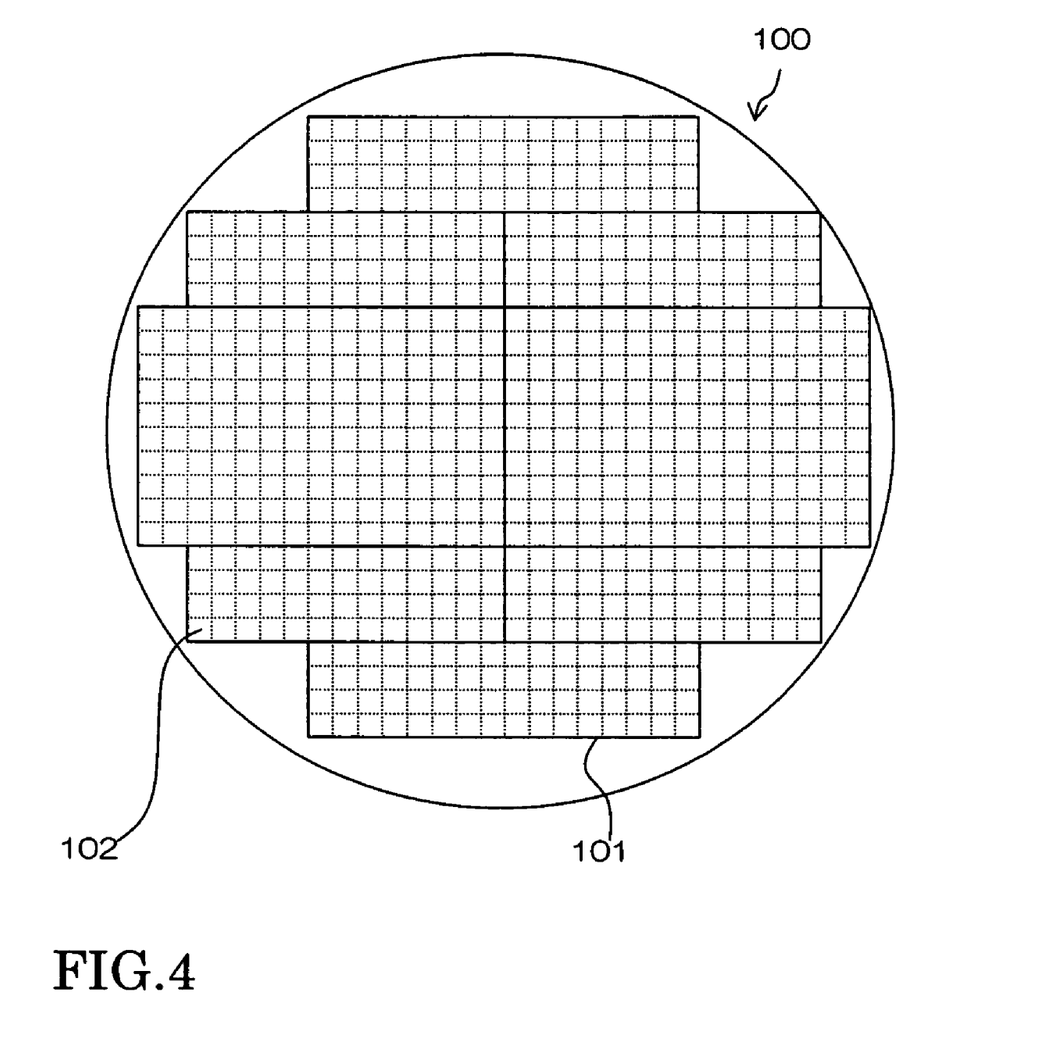
FIG. 4 is a plan view of a wafer for fabricating thin-film magnetic heads in which the magnetoresistive sensors according to the present invention are employed.

Next, explanation regards a wafer for fabricating a thin-film magnetic head having the above-described CPP sensor as a head sensor. FIG. 4 is a schematic plan view of the wafer. Wafer 100 is partitioned into a plurality of thin-film magneto-electric transducer assemblies 101. Each thin-film magneto-electric transducer assembly 101 includes thin-film magneto-electric transducers 102, in each of which CPP sensor 2 is stacked, and serves as a work unit in the polishing process of the ABS. Cut margins (not shown) are provided for cutting between thin-film magneto-electric transducer assemblies 101 and between thin-film magneto-electric transducers 102.

Figure 5:
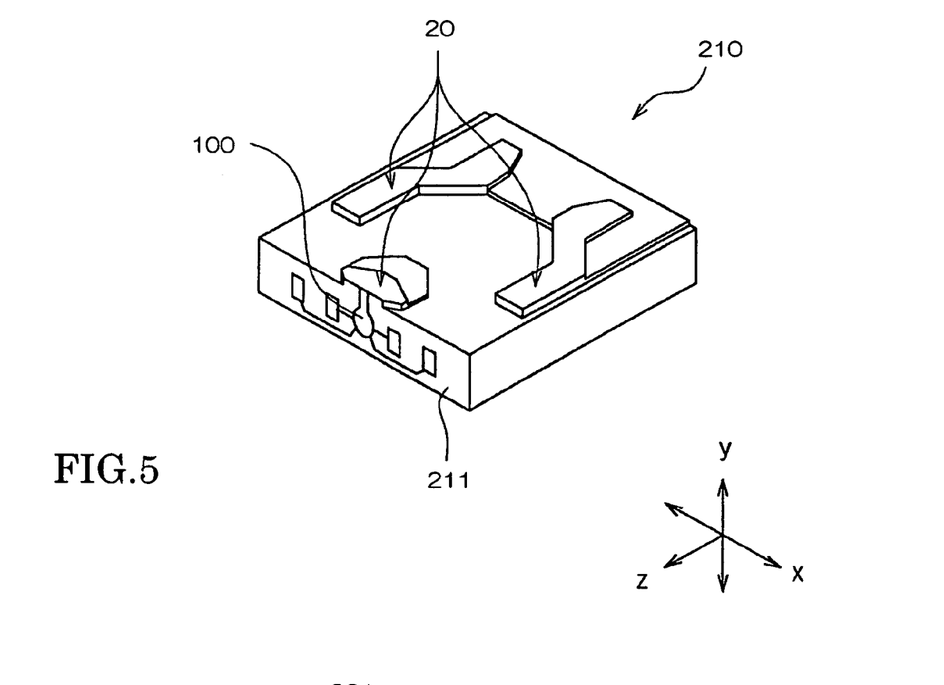
FIG. 5 is a perspective view illustrating a slider included in a head gimbal assembly in which a magnetoresistive sensor according to the present invention is employed.

Explanation next regards a head gimbal assembly and a hard disk device having CPP sensor 2 as a head sensor. Referring to FIG. 5, explanation is first presented regarding slider 210 included in the head gimbal assembly. In the hard disk device, slider 210 is arranged opposite to the hard disk, which is a rotarily-driven disciform storage medium. Slider 210 is provided with body 211 mainly formed of substrate 1 and overcoat layer 17 shown in FIG. 5. Body 211 has a substantially hexahedral form. One surface of the six surfaces of body 211 is positioned opposite to the hard disk, air bearing surface 20 being formed thereon. When the hard disk rotates moving in the z direction in FIG. 5, the airflow that passes between the hard disk and slider 210 creates a dynamic lift, which is applied to slider 210 downward in the y direction of FIG. 5. Slider 210 is lifted away from the surface of the hard disk by this dynamic lift. For reference, the x direction in FIG. 5 is the transverse direction of the track of the hard disk. In the proximity to the trailing edge of slider 210 on the outlet side of the airflow (the end portion at the lower left in FIG. 5), thin-film magnetic head 100 is formed, with CPP sensor 2 employed as a head sensor.

Figure 6:
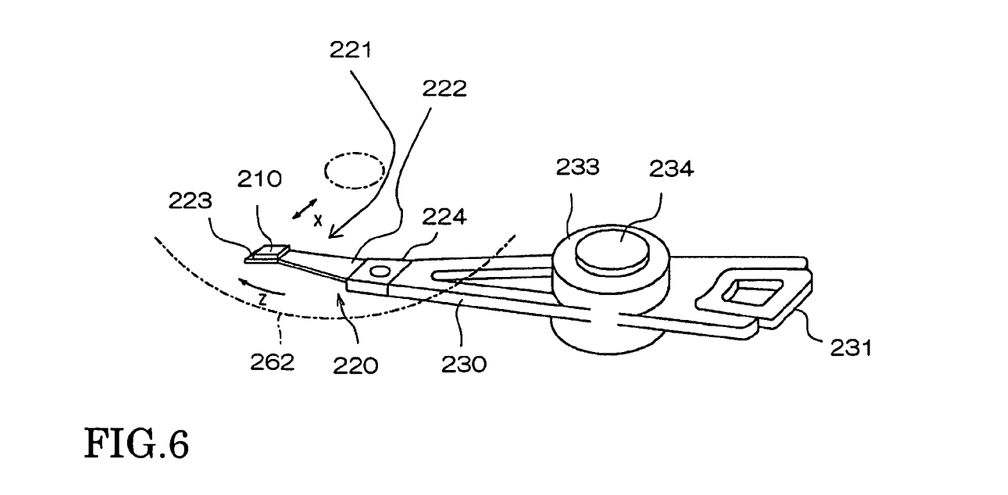
FIG. 6 is a perspective view illustrating a head arm assembly that includes a head gimbal assembly in which a magnetoresistive sensor according to the present invention is employed.

Referring to FIG. 6, explanation is next presented regarding head gimbal assembly having CPP sensor employed as a head sensor. Head gimbal assembly 220 is provided with slider 210 and suspension 221 for elastically supporting slider 210. Suspension 221 has; load beam 222 in a shape of flat spring and made of, for example, stainless steel; flexure 223 attached to one end of load beam 222, and to which slider 210 is fixed, while providing appropriate degree of freedom to slider 210; and base plate 224 provided in the other end of load beam 222. Base plate 224 is adapted to be attached to arm 230 of the actuator for moving slider 210 in the transverse direction of the track of the hard disk 262. The actuator is provided with arm 230 and a voice coil motor for driving arm 230. The portion of the flexure to which slider 210 is attached is provided with a gimbal section for maintaining a constant posture of slider 210.

Head gimbal assembly 220 is attached to arm 230 of the actuator. The arrangement having a head gimbal assembly attached to a single arm is called a head arm assembly.

The arrangement having head gimbal assemblies attached to respective arms of a carriage having a plurality of arms is called a head stack assembly. FIG. 6 illustrates an example of a head arm assembly, in which head gimbal assembly 220 is attached to one end of arm 230. To the other end of arm 230, there is attached coil 231, which makes a part of a voice coil motor. In the intermediate portion, bearing section 233 is provided to fit on shaft 234 for rotatably holding arm 230.

Figure 7:
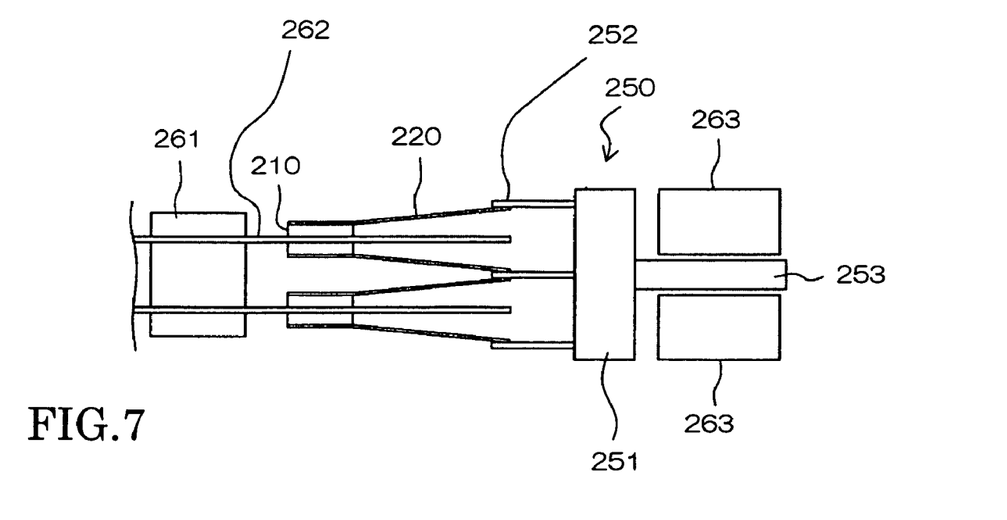
FIG. 7 is an explanatory diagram illustrating the essential part of a hard disk device in which magnetoresistive sensors according to the present invention are employed.
Figure 8:
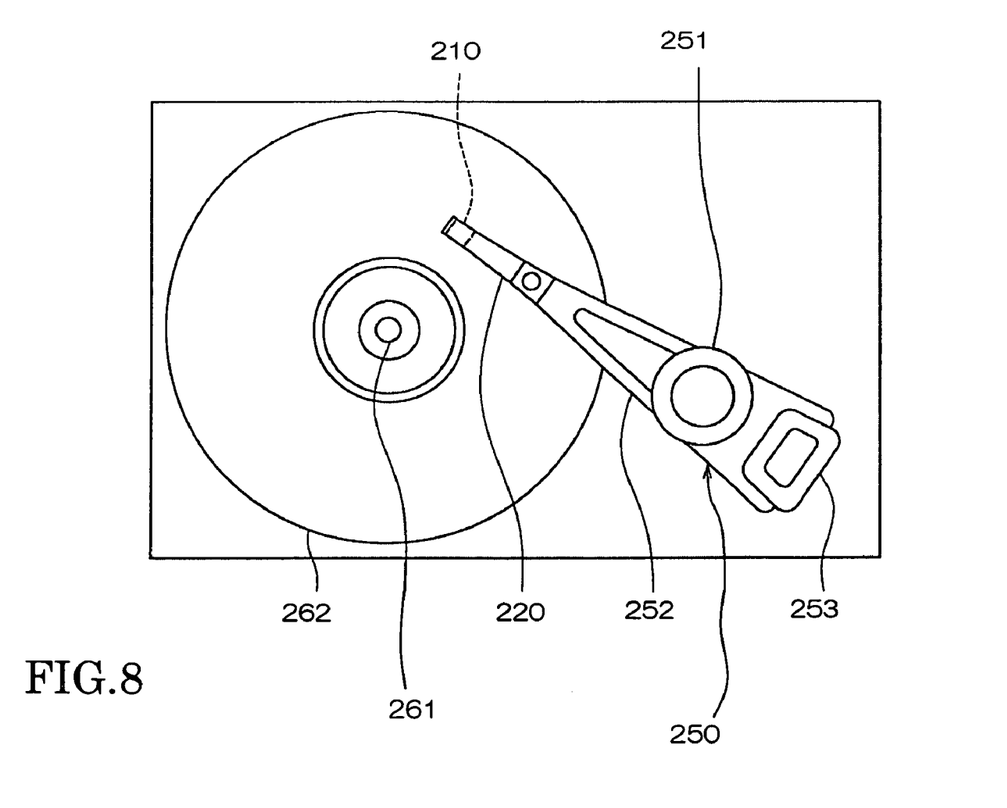
FIG. 8 is a plan view of a hard disk device in which magnetoresistive sensors according to the present invention are employed.

Referring to FIG. 7 and FIG. 8, explanation is next presented regarding the head stack assembly and the hard disk device employing CPP sensor as a head sensor. FIG. 7 is an explanatory diagram illustrating an essential part of the hard disk device, and FIG. 8 is a plan view of the hard disk device. Head stack assembly 250 has carriage 251 provided with a plurality of arms 252. A plurality of head gimbal assemblies 220 are attached to a plurality of arms 252. Head gimbal assemblies 220 is aligned spaced apart from each other in the vertical direction. Coil 253, which is a part of the voice coil, is attached to carriage 251 at the opposite side to arms 252. Head stack assembly 250 is installed in the hard disk device, which has a plurality of hard disks connected to spindle motor 261. Two sliders for each hard disk 262 are arranged in opposed positions interposing hard disk 262. The voice coil motor has a permanent magnet 263 arranged in opposed positions interposing coil 253 of head stack assembly 250.

Head stack assembly 250 and the actuator, except for sliders 210, work as a locating device, carrying the sliders 210 and operating to locate sliders 210 relative to hard disks 262.

The hard disk device moves sliders 210 in the transverse directions of the tracks of hard disks by the actuator and locates sliders 210 relative to hard disk 262. The thin-film magnetic head contained in slider 210 records information to hard disk 262 through a writing head, and also reads information recorded in hard disk 262 through a read head in which CPP sensor 2 is employed as a magnetic head.

Although certain preferred embodiments of the present invention have been shown and described in detail, it should be understood that various changes and modifications may be made without departing from the spirit or scope of the appended claims.

What is claimed is:

1. A magnetoresistive sensor comprising stacked layers, said stacked layers comprising:
a first magnetic layer having a first ferromagnetic layer in which a direction of magnetization is pinned relative to an external magnetic field, a first non-magnetic intermediate layer, and a second ferromagnetic layer in which a direction of magnetization is pinned in a direction opposite to the direction of magnetization of said first ferromagnetic layer, said first ferromagnetic layer, said first non-magnetic intermediate layer, and said second ferromagnetic layer being stacked in this order;
a second non-magnetic intermediate layer; and
a second magnetic layer in which a direction of magnetization is variable depending on said external magnetic field,
said first magnetic layer, said second non-magnetic intermediate layer, and said second magnetic layer being stacked in this order to form said stacked layers, wherein
a sense current flows through said stacked layers substantially in the direction of stacking,
a ratio of a layer thickness of said second ferromagnetic layer to a layer thickness of said first ferromagnetic layer is in a range between 1.4 and 1.9, and
a ratio of a product of a saturation magnetization and the layer thickness of said second ferromagnetic layer to a product of a saturation magnetization and the layer thickness of said first ferromagnetic layer is in a range between 0.9 and 1.1,
wherein said second ferromagnetic layer includes a layer containing nickel and iron,
wherein said second ferromagnetic layer includes a partial layer stack comprising a first partial layer containing cobalt and iron, a second partial layer containing nickel and iron, and a third partial layer containing cobalt and iron, said first partial layer, said second partial layer, and said third partial layer being stacked in this order to form said partial layer stack,
wherein said second ferromagnetic layer includes said partial layer stack, a third non-magnetic intermediate layer, and said partial layer stack, being stacked in this order.

2. A thin-film magnetic head comprising said magnetoresistive sensor as claimed in claim 1 for reading data recorded in a storage medium, wherein said magnetoresistive sensor is positioned on an air bearing surface, which is a surface of said thin-film magnetic head opposite to said storage medium.

3. A wafer comprising at least one thin-film magnetoelectric transducer for fabricating the thin-film magnetic head as claimed in claim 2.

4. A head gimbal assembly comprising:
a slider comprising said thin-film magnetic head as claimed in claim 2, wherein said slider is positioned opposite to said storage medium; and
a suspension for elastically supporting said slider.

5. A head arm assembly comprising:
said head gimbal assembly as claimed in claim 4; and
an arm to which said head gimbal assembly is attached.

6. A head stack assembly comprising:
a carriage having a plurality of arms; and
a plurality of said head gimbal assemblies as claimed in claim 4, wherein each of said head gimbal assembly is attached to each of said plurality of arms of said carriage, respectively.

7. A hard disk device comprising:
a slider having a thin-film magnetic head as claimed in claim 2, wherein said slider is positioned opposite to a rotarily-driven disciform storage medium; and
a locating device for carrying said slider and locating said slider relative to said storage medium.

8. A magnetoresistive sensor comprising stacked layers, said stacked layers comprising:
a first magnetic layer having a first ferromagnetic layer in which a direction of magnetization is pinned relative to an external magnetic field, a first non-magnetic intermediate layer, and a second ferromagnetic layer in which a direction of magnetization is pinned in a direction opposite to the direction of magnetization of said first ferromagnetic layer, said first ferromagnetic layer, said first non-magnetic intermediate layer, and said second ferromagnetic layer being stacked in this order;
a second non-magnetic intermediate layer; and
a second magnetic layer in which a direction of magnetization is variable depending on said external magnetic field,
said first magnetic layer, said second non-magnetic intermediate layer, and said second magnetic layer being stacked in this order to form said stacked layers, wherein
a sense current flows through said stacked layers substantially in the direction of stacking,
a ratio of a layer thickness of said second ferromagnetic layer to a layer thickness of said first ferromagnetic layer is in a range between 1.4 and 1.9, and
a ratio of a product of a saturation magnetization and the layer thickness of said second ferromagnetic layer to a product of a saturation magnetization and the layer thickness of said first ferromagnetic layer is in a range between 0.9 and 1.1,
wherein said second ferromagnetic layer includes a layer containing nickel and iron, and
wherein said second ferromagnetic layer includes a partial layer stack comprising a first partial layer containing cobalt and iron, a second partial layer containing nickel and iron, and a third partial layer containing cobalt and iron, said first partial layer, said second partial layer, and said third partial layer being stacked in this order to form said partial layer stack.

* * * * *